United States Patent
Lagarde et al.

(10) Patent No.: US 10,227,822 B2
(45) Date of Patent: Mar. 12, 2019

(54) HOME-AUTOMATION EQUIPMENT FOR CLOSURE OR SOLAR PROTECTION AND METHOD FOR RECHARGING A BATTERY FOR SUCH EQUIPMENT

(71) Applicant: SOMFY ACTIVITES SA, Cluses (FR)

(72) Inventors: Eric Lagarde, Sallanches (FR); Norbert Dupielet, Sallanches (FR)

(73) Assignee: SOMFY ACTIVITIES SA, Cluses (FR)

( * ) Notice: Subject to any disclaimer, the term of this patent is extended or adjusted under 35 U.S.C. 154(b) by 0 days.

(21) Appl. No.: 15/744,292

(22) PCT Filed: Aug. 26, 2016

(86) PCT No.: PCT/EP2016/070170
§ 371 (c)(1),
(2) Date: Jan. 12, 2018

(87) PCT Pub. No.: WO2017/036947
PCT Pub. Date: Mar. 9, 2017

(65) Prior Publication Data
US 2018/0202227 A1    Jul. 19, 2018

(30) Foreign Application Priority Data

Aug. 28, 2015    (FR) ..................... 15 58008

(51) Int. Cl.
*E06B 9/68*    (2006.01)
*E06B 9/72*    (2006.01)
(Continued)

(52) U.S. Cl.
CPC .................. *E06B 9/72* (2013.01); *E06B 9/32* (2013.01); *E06B 9/68* (2013.01); *H01M 10/44* (2013.01);
(Continued)

(58) Field of Classification Search
CPC ..... E06B 9/72; E06B 9/68; E06B 9/70; E06B 9/32; H01M 10/44; H01M 2220/00; H01M 2220/10; H02J 7/0042; H02J 7/355
(Continued)

(56) References Cited

U.S. PATENT DOCUMENTS 4,842,108 A * 6/1989 Anderson ............ B65H 75/425
                                                191/12.2 A
7,389,806 B2   6/2008 Kates
(Continued)

FOREIGN PATENT DOCUMENTS

CN        102272403       12/2011
CN        203296555       11/2013
(Continued)

OTHER PUBLICATIONS

International Search Report, dated Nov. 10, 2016, from corresponding PCT/EP2016/070170 application.

*Primary Examiner* — Colleen M Chavchavadze
*Assistant Examiner* — Jeremy C Ramsey
(74) *Attorney, Agent, or Firm* — Young & Thompson (57) ABSTRACT

A home-automation equipment includes a concealing device including a screen, a holding device of the screen, a first motorized drive device and an autonomous electrical energy supply device. The first device includes an electromechanical actuator which makes it possible to raise and lower the screen. The supply device includes a battery arranged on the holding device of the screen, a power supply cable and an electrical connection element that is electrically connected to the battery by the cable, the element being designed to be connected to an external electrical supply source, in order to recharge the battery. The concealing device includes a second motorized drive device including an electromechani- (Continued)

cal actuator making it possible to wind and unwind the cable on a winding spool.

13 Claims, 5 Drawing Sheets

(51) Int. Cl.
  *E06B 9/32* (2006.01)
  *H01M 10/44* (2006.01)
  *H02J 7/00* (2006.01)

(52) U.S. Cl.
  CPC ..... *H02J 7/0042* (2013.01); *E06B 2009/6809* (2013.01); *H01M 2220/10* (2013.01)

(58) Field of Classification Search
  USPC ................ 242/378, 378.1, 378.2, 385, 385.4
  See application file for complete search history.

(56) References Cited

U.S. PATENT DOCUMENTS

| | | | | |
|---|---|---|---|---|
| 2009/0308543 | A1* | 12/2009 | Kates | E06B 9/44 160/5 |
| 2013/0126809 | A1* | 5/2013 | Britten | G09F 7/18 254/385 |
| 2014/0305602 | A1* | 10/2014 | Kirby | E06B 9/42 160/310 |
| 2014/0315423 | A1* | 10/2014 | Cole | H01R 13/72 439/501 |
| 2015/0362896 | A1* | 12/2015 | Feldstein | G05B 11/01 700/275 |

FOREIGN PATENT DOCUMENTS

| | | |
|---|---|---|
| EP | 1245782 | 10/2002 |
| FR | 3 000 625 A1 | 7/2014 |
| WO | 2006/091303 A1 | 8/2006 |

* cited by examiner

HOME-AUTOMATION EQUIPMENT FOR CLOSURE OR SOLAR PROTECTION AND METHOD FOR RECHARGING A BATTERY FOR SUCH EQUIPMENT

The present invention relates to a closure or solar protection home-automation equipment.

The present invention also relates to a method for recharging a battery for such closure or solar protection home-automation equipment.

In general, the present invention relates to the field of concealing devices comprising a motorized drive device setting a screen in motion between at least one first position and one second position.

A motorized drive device comprises an electromechanical actuator for a movable element for closing, blacking out or providing solar protection such as a blind or any other equivalent material, hereinafter referred to as a screen.

Document WO 2006/091303 A1 is already known, which describes a closure or solar protection home-automation equipment.

The concealing device comprises a housing, a winding tube, a screen, a load bar, a motorized drive device and an autonomous electrical energy supply device.

A first end of the screen is positioned at the housing. Additionally, a second end of the screen is fastened to the load bar.

The motorized drive device comprises an electromechanical actuator making it possible to raise and lower the screen, between a high position and a low position and, more particularly to wind and unwind the screen, between a wound position and an unwound position. The electromechanical actuator is electrically connected to the autonomous electrical energy supply device.

The autonomous electrical energy supply device comprises a battery. The battery is positioned at the housing of the concealing device and, more particularly, inside a winding tube of the screen. The battery comprises several rechargeable energy storage elements.

The autonomous electrical energy supply device comprises a first electrical connection element and a second electrical connection element.

The first electrical connection element is electrically connected to the battery by an electrical connection. The electrical connection between the first electrical connection element and the battery is implemented using a power supply cable extending along the screen and, more particularly, integrated into the fabric of the screen.

The first electrical connection element is positioned at the load bar of the concealing device and configured to be connected to an external electric supply source, so as to recharge the battery.

The first electrical connection element is either an electrical connector, or a coil cooperating with another coil positioned at a threshold of an opening.

In this way, the first electrical connection element can be electrically connected to a wall outlet of a power supply network.

The second electrical connection element is positioned at the housing of the concealing device. The electrical connection between the first electrical connection element and the battery is implemented through the second electrical connection element electrically connecting the power supply cable to the battery.

The power supply cable comprises a first part extending between the first electrical connection element and the second electrical connection element, as well as a second part extending between the second electrical connection element and the battery.

However, this home-automation equipment has the drawback of electrically connecting the first electrical connection element, positioned at the load bar of the concealing device, to the battery, positioned at the housing of the concealing device, using a power supply cable extending along the windable fabric of the screen.

The power supply cable electrically connecting the first electrical connection element to the battery is wound with the screen around the winding tube, when the screen is moved toward the wound position.

Thus, the winding and unwinding of the power supply cable depend on the movements of the screen commanded by the motorized drive device.

Furthermore, the second electrical connection element, connecting the power supply cable to the battery, is subject to stresses exerted during the unwinding and the winding of the screen.

Consequently, the electrical connection between the first electrical connection element and the battery can be damaged during use of the home-automation equipment.

Furthermore, the electrical connection between the power supply cable and the battery is complex to carry out, since the power supply cable is wound around the winding tube of the screen.

The integration of the power supply cable into the windable fabric of the screen may also cause damage to the latter during the unwinding and winding of the screen around the winding tube.

Furthermore, the integration of the power supply cable into the windable fabric is detrimental to the aesthetics of the screen.

The present invention aims to resolve the aforementioned drawbacks and to propose a closure or solar protection home-automation equipment making it possible to simplify an electrical connection between an electrical connection element and a battery positioned at a device for holding a screen of a concealing device, so as to be able to recharge the battery from an external electrical supply source, while guaranteeing the reliability of this electrical connection and minimizing the costs of obtaining the home-automation equipment.

In this respect, according to a first aspect, the present invention relates to a closure or solar protection home-automation equipment comprising a concealing device,
  the concealing device comprising at least:
    screen,
    device for holding the screen,
    first motorized drive device, and
    an autonomous electrical energy supply device,
  the first motorized drive device comprising at least:
    an electromechanical actuator making it possible to raise and lower the screen, between a high position and a low position, the electromechanical actuator being electrically connected to the autonomous electrical energy supply device,
  the autonomous electrical energy supply device comprising at least:
    battery, the battery being positioned at the holding device of the screen,
    power supply cable, and
    an electrical connection element, the electrical connection element being electrically connected to the battery by the power supply cable, the electrical connection element being configured to be connected to an external electric supply source, so as to recharge the battery.

According to the invention, the concealing device comprises a second motorized drive device, the second motorized drive device comprising at least:

an electromechanical actuator making it possible to wind and unwind the power supply cable, electrically connecting the electrical connection element to the battery, on a winding spool, between a wound position and an unwound position.

Thus, the concealing device comprises two independent motorized drive devices respectively comprising an electromechanical actuator, where the first motorized drive device makes it possible to move the screen, between a high position and a low position, and where the second motorized drive device makes it possible to wind and unwind the power supply cable around the winding spool, between a wound position and an unwound position, so as to be able to access the electrical connection element to recharge the battery positioned at the holding device of the screen.

In this way, the electrical connection between the electrical connection element and the battery positioned at the holding device of the screen is implemented through a power supply cable able to be wound by the second motorized drive device, independently of the motorized drive device making it possible to move the screen, between a high position and a low position, so as to guarantee the reliability of this electrical connection and minimize the costs of obtaining the home-automation equipment.

Furthermore, the positioning of the electrical connection element at one end of the power supply cable makes it possible to facilitate, for the user, the electrical connection of the external electric supply source to the electrical connection element, since this electrical connection between the electrical connection element and the external electric supply source can be implemented when the power supply cable is in unwound position or between the wound position and the unwound position.

Moreover, the battery can be recharged without having to disassemble part of the home-automation equipment and, in particular, the holding device of the screen.

In a first example embodiment, the second motorized drive device is positioned outside a housing of the concealing device, the housing being an integral part of the holding device of the screen.

In a second example embodiment, the second motorized drive device is positioned inside a housing of the concealing device, the housing being an integral part of the holding device of the screen.

In practice, the electromechanical actuator of the second motorized drive device comprises at least one electric motor, the output shaft of which is kinematically connected to the winding spool of the power supply cable.

According to one preferred feature of the invention, the first motorized drive device comprises an electronic control unit, the electronic control unit controlling, on the one hand, the electromechanical actuator of the first motorized drive device and, on the other hand, the electromechanical actuator of the second motorized drive device.

According to another preferred feature of the invention, the second motorized drive device comprises a platen, the platen being mounted on the holding device of the screen using fastening elements.

Preferably, the winding spool of the power supply cable is mounted freely rotating on the platen, around a rotation axis defined by a rotation shaft, the rotation shaft of the winding spool also comprising an electrical connection element.

In one embodiment, the battery of the autonomous electrical energy supply device, which is able to be recharged through the electrical connection element and the power supply cable, is configured to supply electrical energy to the second motorized drive device.

In another embodiment, the autonomous electrical energy supply device comprises another battery, so as to supply electrical energy to the second motorized drive device.

According to a second aspect, the present invention relates to a method for recharging a battery for a closure or solar protection home-automation equipment as set out above.

According to the invention, this method comprises at least the following steps:

lowering the electrical connection element connected to the power supply cable toward the unwound position using the second motorized drive device, and connecting an external electrical supply source on the electrical connection element positioned at the end of the power supply cable.

This method for recharging a battery has features and advantages similar to those previously described, relative to the home-automation equipment according to the invention.

In a first embodiment, before the step for lowering the electrical connection element, the method for recharging the battery comprises at least the following steps:

determining the charge level of the battery, comparing the determined value of the charge level of the battery to a predetermined threshold value, and controlling the electromechanical actuator of the second motorized drive device, when the determined value of the charge level of the battery is below the predetermined threshold value.

In a second embodiment, before the step for lowering the electrical connection element, the method for recharging the battery comprises at least the following steps:

activating a selection element of a local command unit, the local command unit cooperating with an electronic control unit controlling the second motorized drive device, and controlling the electromechanical actuator of the second motorized drive device.

Other particularities and advantages of the invention will also appear in the description below, done in reference to the appended drawings, provided as non-limiting examples.

Figure 1:
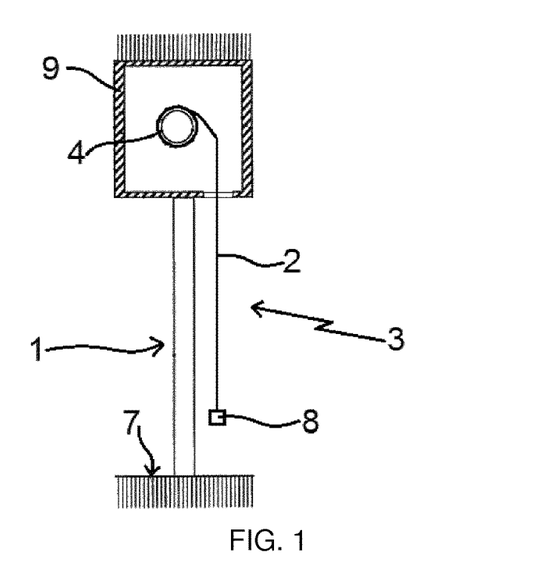
FIG. 1 is a cross-sectional schematic view of a home-automation equipment according to one embodiment of the invention.
Figure 2:
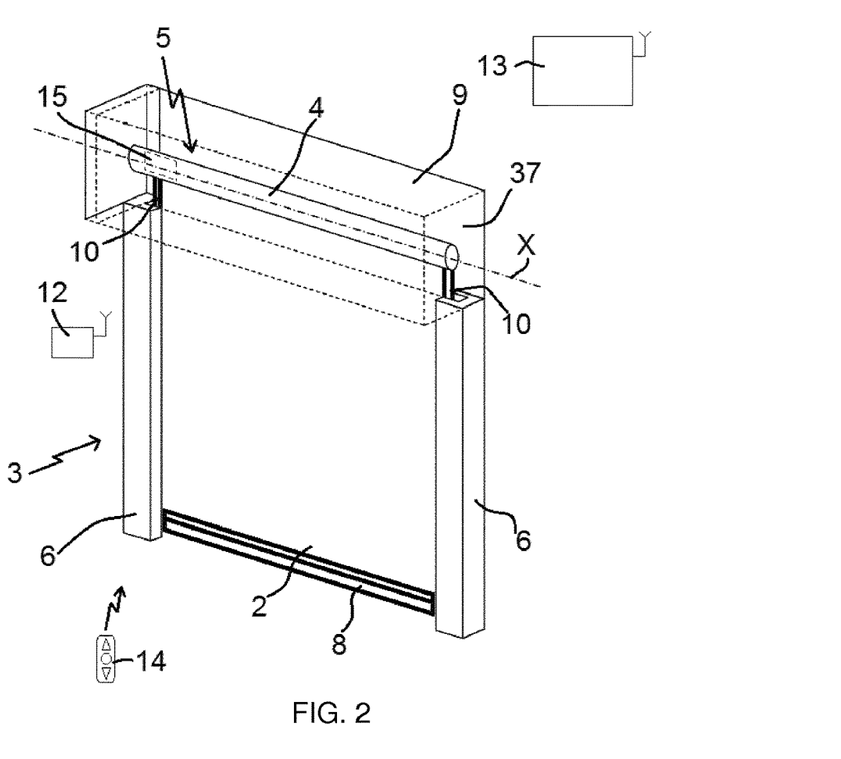
FIG. 2 is a schematic perspective view of the home-automation equipment illustrated in FIG. 1.

In reference to FIGS. 1 and 2, we will first describe home-automation equipment according to the invention and installed in a building comprising an opening 1, window or door, equipped with a screen 2 belonging to a concealing device 3, in particular a motorized blind.

The concealing device 3 may be a blind, in particular made from fabric, that is windable, pleated or with slats.

The concealing device 3 comprises a holding device 9, 23 of the screen 2.

A windable blind according to one embodiment of the invention will be described in reference to FIGS. 1 and 2.

The screen 2 of the concealing device 3 is wound on a winding tube 4 driven by a first motorized drive device 5 and movable between a wound position, in particular an upper position, and an unwound position, in particular a lower position.

The moving screen 2 of the concealing device 3 is a closure, concealing and/or solar protection screen, winding on the winding tube 4, the inner diameter of which is substantially greater than the outer diameter of an electromechanical actuator 11, such that the electromechanical actuator 11 can be inserted into the winding tube 4, during the assembly of the concealing device 3.

The first motorized drive device 5 comprises the electromechanical actuator 11, in particular of the tubular type, making it possible to set the winding tube 4 in rotation so as to unwind or wind the screen 2 of the concealing device 3.

The concealing device 3 comprises the winding tube 4 for winding the screen 2, where, in the mounted state, the electromechanical actuator 11 is inserted into the winding tube 4.

The concealing device 3 also comprises a load bar 8 for exerting tension on the screen 2.

In a known manner, the windable blind, which forms the concealing device 3, includes a fabric, forming the screen 2 of the windable blind 3. A first end of the screen 2, in particular the upper end of the screen 2 in the assembled configuration of the concealing device 3 in the home-automation equipment, is fastened to the winding tube 4. Additionally, a second end of the screen 2, in particular the lower end of the screen 2 in the assembled configuration of the concealing device 3 in the home-automation equipment, is fastened to the load bar 8.

Here, the fabric forming the screen 2 is made from a textile material.

In an example embodiment that is not shown, the first end of the screen 2 has an eyelet through which a rod is positioned, in particular made from plastic. This eyelet made at the first end of the screen 2 is obtained using a seam of the fabric forming the screen 2. During the assembly of the screen 2 on the winding tube 4, the eyelet and the rod situated at the first end of the screen 2 are inserted by sliding in a slot arranged on the outer face of the winding tube 4, in particular over the entire length of the winding tube 4, so as to be able to wind and unwind the screen 2 around the winding tube 4.

In the case of a windable blind, the high wound position corresponds to a predetermined high end-of-travel position, or to the setting in support of the load bar 8 of the screen 2 against an edge of a housing 9 of the windable blind 3, and the low unwound position corresponds to a predetermined low end-of-travel position, or to the setting in support of the load bar 8 of the screen 2 against a threshold 7 of the opening 1, or to complete unwinding of the screen 2.

The winding tube 4 is positioned inside the housing 9 of the windable blind 3. The screen 2 of the windable blind 3 winds and unwinds around the winding tube 4 and is housed at least partially inside the housing 9.

In general manner, the housing 9 is positioned above the opening 1, or in the upper part of the opening 1.

The housing 9 is an integral part of the holding device 9, 23 of the screen 2.

In one embodiment illustrated in FIG. 2, the screen 2 also includes, at each of its lateral edges, a fastening part 10 in the form of a strip. The fastening parts 10 form an over-thickness at each lateral edge of the screen 2. The home-automation equipment comprises two lateral guideways 6 positioned along two lateral edges of the opening 1. The lateral guideways 6 additionally respectively comprise a groove inside which a fastening part 10 of the screen 2 is retained, as well as a lateral end of the load bar 8 fastened to the second end of the screen 2.

Thus, during the winding or unwinding of the screen 2, the fastening parts 10 fastened on the lateral edges of the screen 2 and the lateral ends of the load bar 8 fastened to the second end of the screen 2 are retained in the lateral guideways 6, so as to guarantee lateral guidance of the screen 2.

Each groove arranged in a lateral guideway 6 makes it possible to prevent the withdrawal of a fastening part 10 fixed on one of the lateral edges of the screen 2, during the movement of the screen 2 between the wound position and the unwound position.

Preferably, each fastening part 10 extends along the entire length of one of the two lateral edges of the screen 2.

In one example embodiment, the fastening parts 10 are respectively fastened at a lateral edge of the screen 2 by gluing, welding or overmolding. Additionally, the fastening parts 10 can be made from plastic and, in particular, overmolded on the lateral edges of the screen 2.

Here, the lateral guideways 6 respectively positioned along a lateral edge of the opening 1 extend along a vertical direction. The lateral guideways 6 extend from the threshold 7 of the opening 1 to the housing 9 of the windable blind 3.

Advantageously, trim elements, not shown, are positioned inside lateral guideways 6 and cooperate with the fastening parts 10 respectively fastened at a lateral edge of the screen 2, so as to keep the screen 2 stretched by applying a force on each fastening part 10 against a wall of the lateral guideway 6.

For example and non-limitingly, the trim elements positioned inside the lateral guideways 6 are provided with elastics, in particular made from plastic. The trim elements can also be provided in the form of foam or include a fly.

Thus, the trim elements positioned inside the lateral guideways 6 make it possible to guarantee the application of a frictional resistance on the fastening parts 10 of the screen 2, so as to keep the screen 2 stretched, during a movement of the screen 2 or when the screen 2 is kept stopped.

Advantageously, the housing 9 of the windable blind 3 and the side guideways 6 form a frame inside which the screen 2 can be moved. This frame can be closed by an additional bar connecting the two lateral guideways 6 at the threshold 7 of the opening 1.

The first motorized drive device 5 is controlled by a control unit. The control unit may, for example, be a local control unit 12, where the local control unit 12 can be connected through a wired or wireless connection with a central control unit 13. The central control unit 13 drives the local control unit 12, as well as other similar local control units distributed throughout the building.

The central control unit 13 can be in communication with a weather station located outside the building, in particular including one or more sensors that can be configured for example to determine the temperature, brightness, or wind speed.

A remote control 14, which can be a type of local control unit, and provided with a control keypad, which comprises selection and display means, further allows a user to intervene on the electromechanical actuator 11 and/or the central control unit 13.

The first motorized drive device 5 is preferably configured to carry out the unwinding or winding commands of the screen 2 of the concealing device 3, which may in particular be acquired by the remote control 14.

The electromechanical actuator 11 of the first motorized drive device 5 belonging to the home-automation equipment of FIGS. 1 and 2 will now be described in reference to FIG. 3.

The electromechanical actuator 11 comprises an electric motor 16. The electric motor 16 comprises a rotor and a stator, not shown and positioned coaxially around a rotation axis X, which is also the rotation axis of the winding tube 4 in the assembled configuration of the motorized drive device 5.

Control means for controlling the electromechanical actuator 11, making it possible to move the screen 2 of the concealing device 3, comprise at least one electronic control unit 15. This electronic control unit 15 is able to operate the electric motor 16 of the electromechanical actuator 11 and, in particular, to allow the supply of electrical energy for the electric motor 16.

Thus, the electronic control unit 15 in particular controls the electric motor 16, so as to open or close the screen 2, as previously described.

The electronic control unit 15 also comprises a module for receiving control orders, the control orders being sent by an order transmitter, such as the remote control 14 designed to control the electromechanical actuator 11 or one of the local 12 or central 13 control units.

Preferably, the control orders receiving module of the electronic control unit 15 is of the wireless type. In particular, the control orders receiving module is configured to receive wireless radio control orders.

The control orders receiving module can also allow the reception of control orders sent by wired means.

The control means of the electromechanical actuator 11 comprise hardware and/or software means.

As one non-limiting example, the hardware means may comprise at least one microcontroller.

The electromechanical actuator 11 of the first motorized drive device 5 is supplied with electrical energy by a battery 24. The electromechanical actuator 11 makes it possible to move the screen 2 of the concealing device 3.

Here, the electromechanical actuator 11 comprises a power supply cable 18 making it possible to supply electrical energy from the battery 24.

The casing 17 of the electromechanical actuator 11 is preferably cylindrical.

In one embodiment, the casing 17 is made from a metal material.

The material of the casing of the electromechanical actuator is in no way limiting and may be different and, in particular, made from plastic.

The electromechanical actuator 11 also comprises a reducing gear device 19 and an output shaft 20.

The electromechanical actuator 11 may also comprise an end-of-travel and/or obstacle detection device, which may be mechanical or electronic.

Advantageously, the electric motor 16 and the reducing gear device 19 are positioned inside the casing 17 of the electromechanical actuator 11.

The output shaft 20 of the electromechanical actuator 11 is positioned inside the winding tube 4, and at least partially outside the casing 17 of the electromechanical actuator 11.

The output shaft 20 of the electromechanical actuator 11 is coupled, by a connecting means 22, to the winding tube 4, in particular using a wheel-shaped connecting means.

The electromechanical actuator 11 also comprises a closing off element 21 for one end of the casing 17.

Here, the casing 17 of the electromechanical actuator 11 is fastened to a support 23, in particular a flange, of the housing 9 of the concealing device 3 using the closing off element 21 forming a torque pin, in particular a closing off and torque-reacting head. In such a case where the closing off element 21 forms a torque pin, the closing off element 21 is also called a fixed point of the electromechanical actuator 11.

The support 23 is also an integral part of the holding device 9, 23 of the screen 2.

Figure 3:
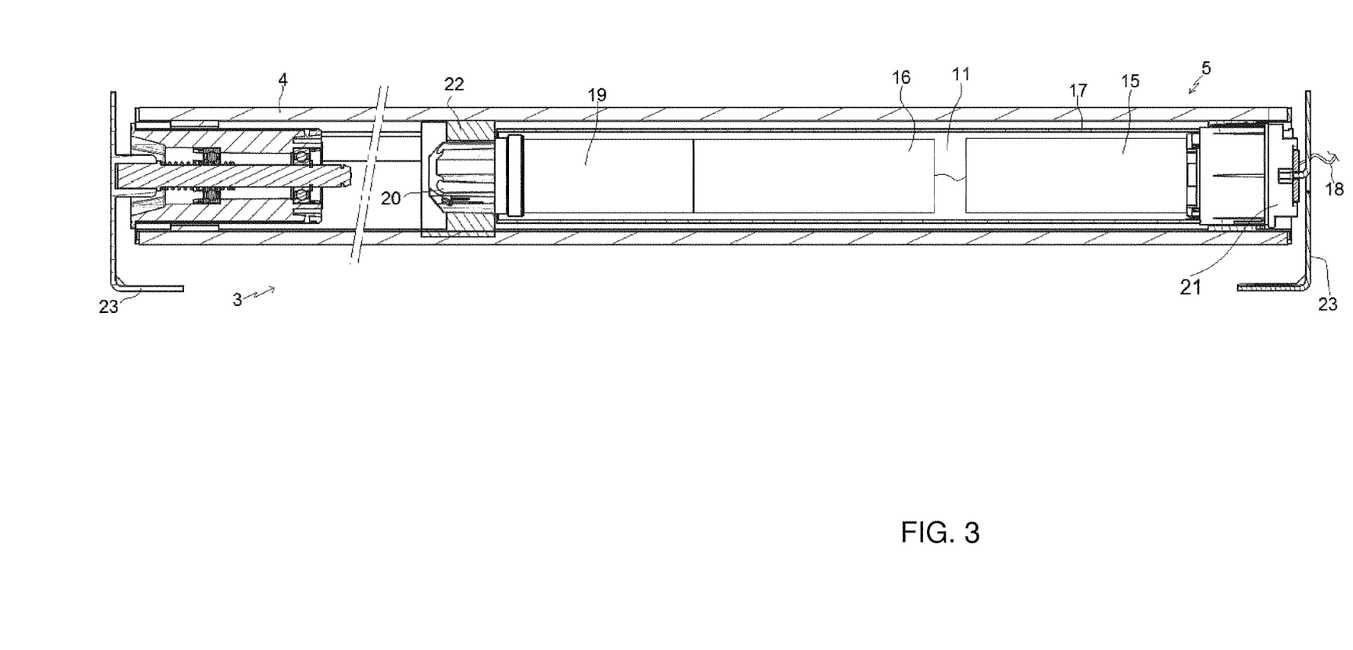
FIG. 3 is an axial and partial schematic sectional view of the home-automation equipment illustrated in FIGS. 1 and 2, showing an electromechanical actuator of this equipment.

Here and as illustrated in FIG. 3, the electronic control unit 15 is positioned inside the casing 17 of the electromechanical actuator 11.

Thus, the electronic control unit 15 is incorporated inside the casing 17 of the electromechanical actuator 11.

In another embodiment, the electronic control unit 15 is positioned outside the casing 17 of the electromechanical actuator 11 and, in particular, mounted on the support 23, in the closing off element 21 or in the housing 9.

Certain parts of the concealing device 3 will now be described in reference to FIGS. 4 to 8.

Figure 4:
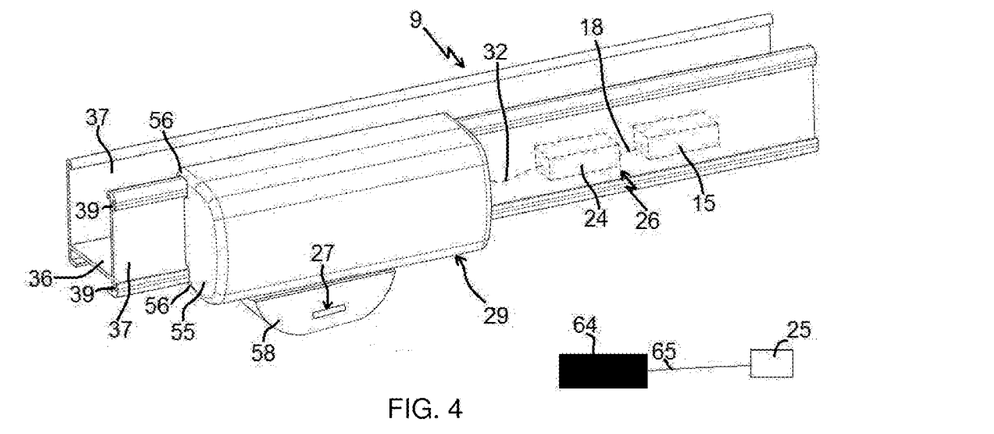
FIG. 4 is a partial schematic perspective view of a concealing device belonging to the home-automation equipment illustrated in FIGS. 1 to 3 and comprising a second motorized drive device, where a power supply cable, electrically connecting an electrical connection element to a battery, is in a wound position.
Figure 5:
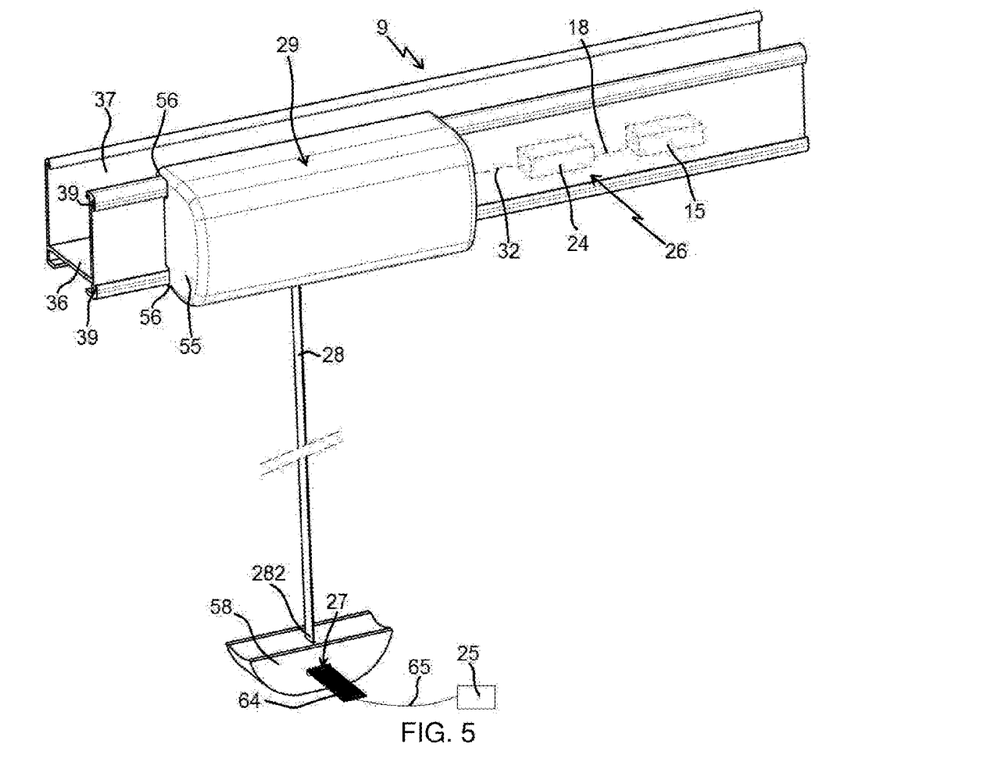
FIG. 5 is a view similar to FIG. 4, where the power supply cable is in the unwound position.
Figure 6:
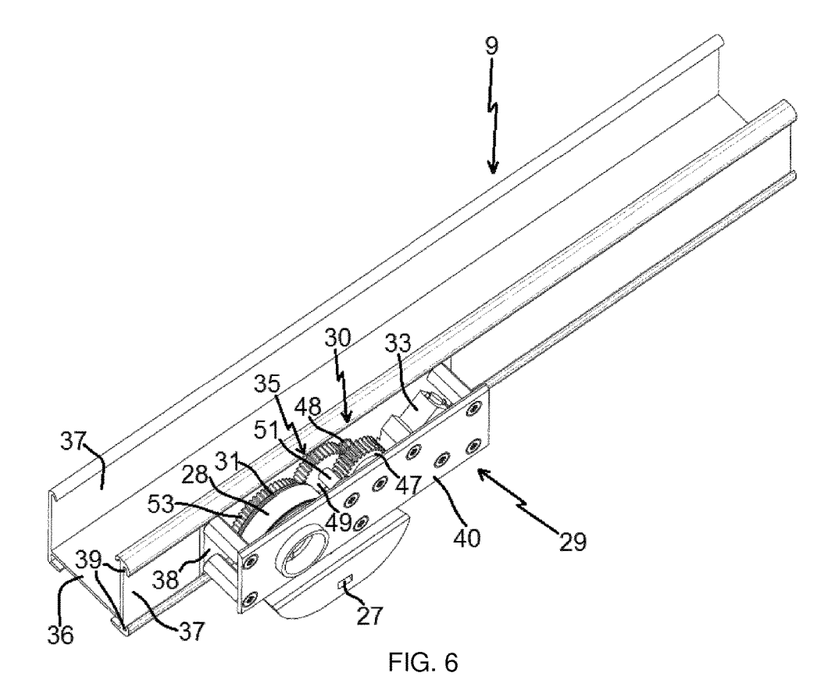
FIG. 6 is a view similar to FIG. 4 and from another angle, where a cover of the second motorized drive device has been removed.

The housing 9 of the concealing device 3 comprises a lower wall 36, an upper wall, not shown in FIGS. 4 to 6 but visible in FIG. 2, and two side walls 37, in the assembled configuration of the concealing device 3. For the clarity of the drawing, the lower wall 36 is not shown in FIG. 2.

The concealing device 3 comprises an autonomous electrical energy supply device 26, in that it makes it possible to power the electromechanical actuator 11, without itself being connected to the sector grid. The electromechanical actuator 11 is electrically connected to the autonomous electrical energy supply device 26.

The autonomous electrical energy supply device 26 comprises the battery 24. The battery 24 is positioned at the holding device 9, 23 of the screen 2 and, more particularly, of the housing 9 of the concealing device 3.

Here, the battery 24 is positioned inside the housing 9.

Alternatively, the battery 24 is positioned outside the housing 9.

Here and as illustrated in FIGS. 4 and 5, the battery 24 is directly electrically connected to the electronic control unit 15, by the power supply cable 18.

Advantageously, the first motorized drive device 5 and, in particular, the electronic control unit 15, comprises charging elements configured to charge the battery 24 from the electrical energy supplied by an external electrical supply source 25.

Here, the battery 24 is of the rechargeable type and supplies electrical energy to the electromechanical actuator 11 of the first motorized drive device 5.

The battery 24 comprises one or several energy storage elements. The energy storage elements of the battery 24 can, in particular, be rechargeable cells.

The autonomous electrical energy supply device 26 comprises a power supply cable 28.

Figure 8:
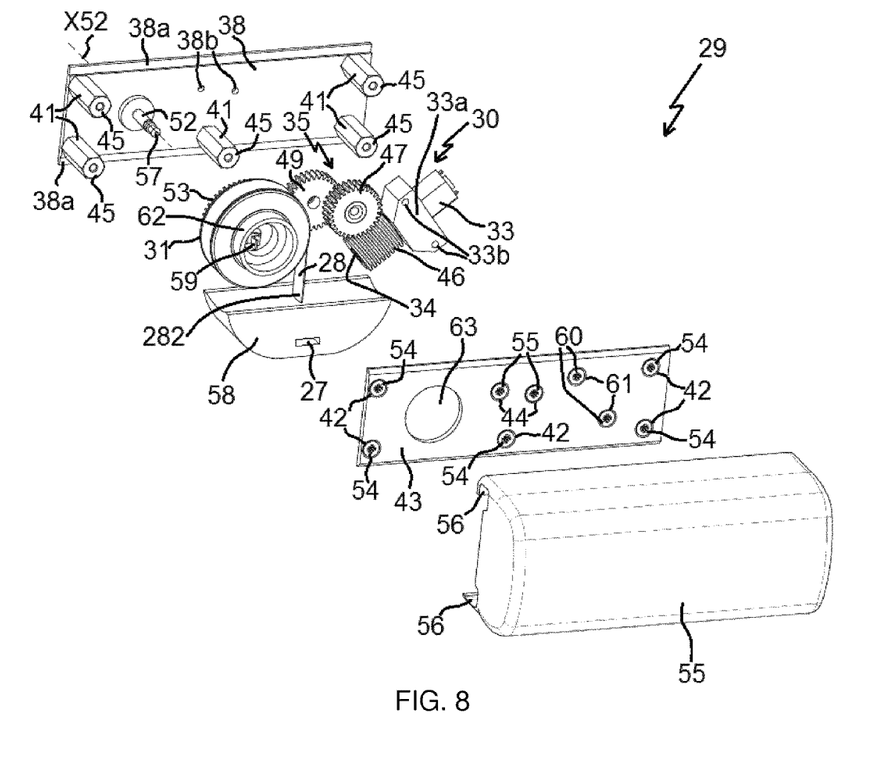
FIG. 8 is an exploded schematic view of the second motorized drive device illustrated in FIGS. 4 to 7.

Here, the power supply cable 28 is a flat electric cable, as shown in FIGS. 5 and 8.

The autonomous electrical energy supply device 26 comprises a first electrical connection element 27.

The first electrical connection element 27 is electrically connected to the battery 24, in particular by the power supply cable 28.

The first electrical connection element 27 is configured to be connected to the external electric supply source 25, so as to recharge the battery 24.

As one non-limiting example, the external electric supply source 25 is a charger able to be connected on a wall outlet, so as to recharge the battery 24 from an electric supply grid.

The first electrical connection element 27 is positioned at a free end 282 of the power supply cable 28.

In practice, the first electrical connection element 27 comprises an electrical connector.

Here, the electrical connector of the first electrical connection element 27 is configured to cooperate, when the power supply cable 28 is unwound, as shown in FIG. 5, with an electrical connector 64 connected by a power supply cable 65 to the external electrical supply source 25.

The concealing device 3 comprises a second motorized drive device 29.

The second motorized drive device 29 will now be described in more detail in reference to FIGS. 4 to 8.

The second motorized drive device 29 comprises at least one electromechanical actuator 30 making it possible to wind and unwind the power supply cable 28 on a winding spool 31, between a wound position and an unwound position.

The second motorized drive device 29 makes it possible to establish an electrical connection between the first electrical connection element 27, positioned at one end of the power supply cable 28, and the battery 24, positioned at the holding device 9, 23 of the screen 2, in particular at the housing 9.

The power supply cable 28 electrically connects the first electrical connection element 27 to the battery 24.

The electromechanical actuator 30 of the second motorized drive device 29 is electrically connected to the autonomous electrical energy supply device 26.

Thus, the concealing device 3 comprises two independent motorized drive devices 5, 29 respectively comprising an electromechanical actuator 11, 30, where the first motorized drive device 5 makes it possible to move the screen 2, between a high position and a low position, and where the second motorized drive device 29 makes it possible to wind and unwind the power supply cable 28 around the winding spool 31, between a wound position and an unwound position, so as to be able to access the electrical connection element 27 to recharge the battery 24 positioned at the holding device 9, 23 of the screen 2, in particular at the housing 9.

In this way, the electrical connection between the first electrical connection element 27 and the battery 24 positioned at the holding device 9, 23 of the screen 2 is implemented through the power supply cable 28 able to be wound by the second motorized drive device 29, independently of the first motorized drive device 5 making it possible to move the screen 2, between a high position and a low position, so as to guarantee the reliability of this electrical connection and minimize the costs of obtaining the home-automation equipment.

Furthermore, the positioning of the first electrical connection element 27 at one end of the power supply cable 28 makes it possible to facilitate, for the user, the electrical connection of the external electric supply source 25 to the electrical connection element 27, since this electrical connection between the electrical connection element 27 and the external electric supply source 25 can be implemented when the power supply cable 28 is in unwound position relative to the winding spool 31, or between the wound position on the winding spool 31 and the unwound position.

Moreover, the battery 24 can be recharged without having to disassemble part of the home-automation equipment and, in particular, the holding device 9, 23 of the screen 2, in particular of the housing 9.

The electromechanical actuator 30 of the second motorized drive device 29 is separate from the electromechanical actuator 11 of the first motorized drive device 5. The electromechanical actuator 11 of the first motorized drive device 5 can be called the first electromechanical actuator and the electromechanical actuator 30 of the second motorized drive device 29 can be called the second electromechanical actuator.

The second electromechanical actuator 30 is supplied with electrical energy by the battery 24. This second electromechanical actuator 30 makes it possible to move the first electrical connection element 27, during the winding or unwinding of the power supply cable 28 around the winding spool 31.

Here, the second electromechanical actuator 30 also comprises a power supply cable 32, making it possible to supply electrical energy from the battery 24.

In practice, the electromechanical actuator 30 of the second motorized drive device 29 comprises at least one electric motor 33, the output shaft 34 of which is connected to the winding spool 31 of the power supply cable 28.

Advantageously, the electromechanical actuator 30 also comprises a reducing gear device 35.

In one embodiment, the electromechanical actuator 30 may also comprise an end-of-travel and/or obstacle detection device, which may be mechanical or electronic.

As mentioned above, the first electrical connection element 27 is positioned at the free end 282 of the power supply cable 28. This free end 282 of the power supply cable 28 is opposite the end of the power supply cable 28 fastened on the winding spool 31.

In practice, the power supply cable 28 comprises a ballast 58, so as to keep this power supply cable 28 tensioned. The ballast 58 is fastened to the free end 282 of the power supply cable 28.

Thus, during the winding and unwinding of the power supply cable 28 using the second motorized drive device 29, the power supply cable 28 is kept tensioned by the ballast 58, so as to guarantee the winding and unwinding of this power supply cable 28 around the winding spool 31.

Advantageously, the weight of the ballast 58 positioned at the free end 282 of the power supply cable 28 depends on the stiffness of the power supply cable 28, during the winding of the latter around the winding spool 31.

Here, the first electrical energy connection element 27 is arranged in the ballast 58 fastened to the free end of the power supply cable 28.

The second motorized drive device 29 comprises a platen 38. The platen 38 is mounted on the holding device 9, 23 of the screen 2, in particular on the housing 9, using fastening elements 38a, 39.

The elements for fastening of the second motorized drive device 29 on the housing 9 may, in particular, be fastening elements by elastic snapping, fitting or screwing.

In a first case, as illustrated in FIGS. 4 to 8, the second motorized drive device 29 is positioned outside the holding device 9, 23 of the screen 2 and, in particular, of the housing 9.

In such a case, the housing 9 of the concealing device 3 comprises slots 39 cooperating with edges 38a, in particular longitudinal, of the platen 38 of the second motorized drive device 29, so as to slide the platen 38 along a wall 37 of the housing 9.

Here and as illustrated in FIGS. 4 to 6, the slots 39 of the housing 9 are arranged on an outer face of a side wall 37 of the housing 9.

Thus, the platen 38 can slide along the side wall 37 of the housing 9 using the slots 39, during the assembly of the second motorized drive device 29 on the housing 9 and, in particular, the mounting of the platen 38 on the housing 9.

The slots 39 of the housing 9 and the edges 38a of the platen 38 form the elements for fastening the platen 38 on the housing 9.

Preferably, the second motorized drive device 29 is kept in position on the holding device 9, 23 of the screen 2, in particular of the housing 9, by blocking elements, not shown.

Thus, the elements for blocking the second motorized drive device 29, in particular the platen 38, on the holding device 9, 23 of the screen 2, in particular the housing 9, make it possible to guarantee the positioning of the second motorized drive device 29 relative to the holding device 9, 23 of the screen 2.

In the example embodiment illustrated in FIGS. 4 to 8, the elements for blocking the second motorized drive device 29, in particular the platen 38, on the housing 9 comprise at least one set screw bearing on the side wall 37 of the housing 9, in particular on the side wall 37 of the housing 9 positioned vis-a-vis the platen 38. The set screw cooperates with a fastening hole arranged in the platen 38, then with the side wall 37 of the housing 9, so as to immobilize the second motorized drive device 29 relative to the housing 9 and, in particular, to guarantee the longitudinal positioning of the second motorized drive device 29 relative to the housing 9.

The blocking elements, in particular for the platen 38, on the holding device 9, 23 of the screen 2, in particular the housing 9, can be different and, in particular, may be screwing, elastic snapping or gluing elements.

In a second case, not shown, the second motorized drive device 29 is positioned inside the holding device 9, 23 of the screen 2 and, in particular, of the housing 9.

The winding spool 31 of the power supply cable 28 is rotatable around an axis X52 relative to the platen 38, this axis X52 being defined by a rotation shaft 52.

The rotation shaft 52 of the winding spool 31 also comprises an electrical connection element, in particular a second electrical connection element 57 of the autonomous electrical energy supply device 26.

Here, the second electrical connection element 57 is formed by the rotation shaft 52 of the winding spool 31.

In practice, the second electrical connection element 57 is electrically connected to the power supply cable 28 on the one hand, and to the battery 24 using electrical energy supply wires, not shown, on the other hand.

The second electrical connection element 57 is thus positioned at the holding device 9, 23 of the screen 2 and, more particularly, of the housing 9 of the concealing device 3.

Here, the power supply cable 28 comprises a plurality of electrical plugs, in particular two, respectively cooperating with a notch arranged in the winding spool 31.

Figure 7:
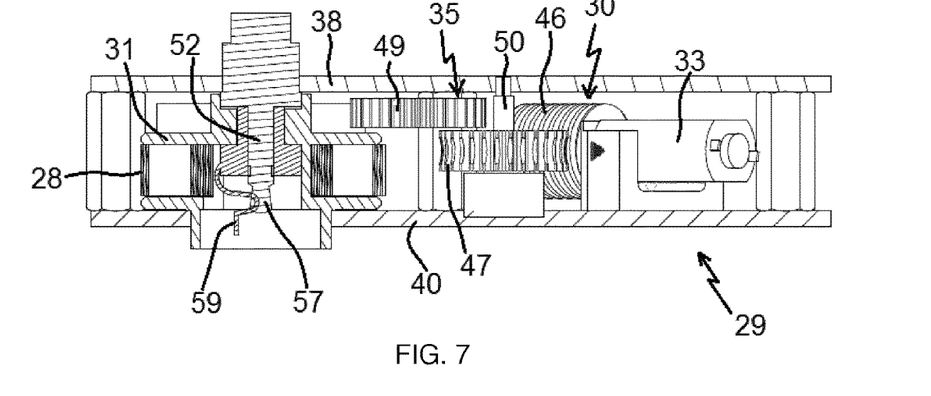
FIG. 7 is a schematic cross-sectional view of the second motorized drive device illustrated in FIGS. 4 to 6.

Furthermore, the electrical connection between the power supply cable 28 and the second electrical connection element 57 is implemented by an elastic return element 59, as illustrated in FIGS. 7 and 8.

Advantageously, the housing 9 comprises an opening, not shown, so as to allow the rotation shaft 52 to pass through it and, more particularly, to allow electrical energy supply wires connecting the second electrical energy connection element 57 to the battery 24 to pass.

Here, the opening is arranged in the side wall 37 of the housing 9, along which the second motorized drive device 29 is positioned.

Furthermore, the platen 38 of the second motorized drive device 29 also comprises an opening, not shown, so as to allow the rotation shaft 52 to pass through it and, more particularly, to allow electrical energy supply wires connecting the second electrical energy connection element 57 to the battery 24 to pass.

In practice, the reducing gear device 35 and the electric motor 33 of the second motorized drive device 29 are mounted on a support 40, as illustrated in FIGS. 6 to 8.

Advantageously, the winding spool 31 is mounted freely rotating relative to the support 40 using a bearing 62.

Here, the bearing 62 traverses an opening 63 arranged in the wall 43 of the support 40.

Furthermore, the bearing 62 is an integral part of the winding spool 31, so as to form a single piece.

The electromechanical actuator 30 is mounted on the platen 38 using fastening elements 54.

Advantageously, the support 40 is fastened on the platen 38 using fastening elements 41, 54, in particular by screwing.

Here, the platen 38 comprises studs 41. The studs 41 of the platen 38 cooperate with fastening screws 54, so as to assemble the support 40 on the platen 38. The fastening screws 54 traverse passage holes 42 arranged in a wall 43 of the support 40.

The studs 41 and the fastening screws 54 form at least some of the elements fastening the support 40 on the platen 38.

The support 40 is positioned on the platen 38 using stops 45.

Here, the stops 45 are formed by the studs 41 of the platen 38, in particular by a face of the studs 41 bearing against the wall 43 of the support 40.

Advantageously, the distance between the support 40 and the platen 38 depends on the length of the studs 41.

As a non-limiting example, the platen 38 comprises five studs 41 respectively cooperating with a fastening screw 54. Each fastening screw 54 cooperates with a passage hole 42 of the support 40.

As illustrated in FIGS. 6 and 8, the electric motor 33 of the second motorized drive device 29 is fastened on the support 40 using fastening elements 60, in particular by screwing.

Here, the electric motor 33 of the second motorized drive device 29 comprises a body 33a in which fastening holes 33b are arranged. The fastening holes 33b arranged in the body 33a of the electric motor 33 cooperate with fastening screws 60, so as to assemble the electric motor 33 of the second motorized drive device 29 on the support 40. The fastening screws 60 traverse passage holes 61 arranged in the wall 43 of the support 40.

The fastening holes 33b arranged in the body 33a of the electric motor 33 and the fastening screws 60 form at least some of the elements fastening the electric motor 33 of the second motorized drive device 29 on the support 40.

The output shaft 34 of the electromechanical actuator 30 of the second motorized drive device 29 is coupled to the winding spool 31, in particular using the reducing gear device 35.

In practice, the electric motor 33 of the second motorized drive device 29 is electrically connected to the battery 24 using the power supply cable 32. The housing 9 and the platen 38 respectively comprise a passage opening for the power supply cable 32.

In the example embodiment illustrated in FIGS. 6 to 8, the output shaft 34 of the electric motor 33 includes a gear 46.

The reducing gear device 35 further comprises a plurality of gears 47, 48, 49. The gears 47, 48, 49 of the reducing gear device 35 are mounted on the support 40 using rotation shafts 50, 51.

Here, the rotation shafts 50, 51 supporting the gears 47, 48, 49 of the reducing gear device 35 extend between the support 40 and the platen 38. The rotation shafts 50, 51 are respectively maintained using an opening 38b arranged in the platen 38 and a fastening screw 55 passing through a passage opening 44 arranged in the support 40.

The gear 48 of the reducing gear device 35 has been removed from FIG. 7, so as to make this figure easier to read and, in particular, to make it possible to see the rotation shaft 50. In FIG. 8, this gear 48 is hidden by the gear 47. Conversely, this gear 48 is visible in FIG. 6.

The gear 46 mounted on the output shaft 34 of the electric motor 33 cooperates with the gear 47 of the reducing gear device 35. The gear 47 is the first gear of the reducing gear device 35.

Here, the gear 46 and the gear 47 form a wheel and worm screw connection.

The winding spool 31 of the power supply cable 28 includes a gear 53. The gear 53 is mounted on the rotation shaft 52.

Here, the gear 53 and the winding spool 31 form a single piece mounted on the rotation shaft 52.

Alternatively, the gear 53 and the winding spool 31 are two separate parts mounted on the rotation shaft 52.

The gear 53 cooperates with the gear 49 of the reducing gear device 35. The gear 49 is the last gear of the reducing gear device 35.

Advantageously, the second motorized drive device 29 comprises a cover 55. The cover 55 is mounted on the holding device 9, 23 of the screen 2, in particular on the housing 9 of the concealing device 3, using fastening elements 56.

Preferably, the fastening elements 56 of the second motorized drive device 29 on the housing 9 of the concealing device 3 are fastening elements by elastic snapping.

In practice, the fastening elements 56 by elastic snapping of the second motorized drive device 29 cooperate with a side wall 37 of the housing 9 and, more particularly, bear against an upper border of the side wall 37 of the housing 9 and a lower border of the side wall 37 of the housing 9.

Here, the fastening by elastic snapping of the second motorized drive device 29 on the side wall 37 of the housing 9 is implemented by an elastic deformation of the cover 55 of the second motorized drive device 29 and by the placement of tabs 56 of the cover 55, on the one hand, against the upper border of the side wall 37 of the housing 9 and, on the other hand, against the lower border of the side wall 37 of the housing 9.

In practice, the fastening by elastic snapping of the second motorized drive device 29 on the side wall 37 of the housing 9 is implemented by an elastic deformation of the tabs 56 of the cover 55.

The electromechanical actuator 11 of the first motorized drive device 5 comprises the electronic control unit 15.

Preferably, the electronic control unit 15 controls, on the one hand, the electromechanical actuator 11 of the first motorized drive device 5, in particular the electric motor 16, and, on the other hand, the electromechanical actuator 30 of the second motorized drive device 29, in particular the electric motor 33.

Thus, the first and second motorized drive devices 5, 29 are controlled using a same electronic control unit 15, so as to simplify the concealing device 3 and minimize the costs of obtaining the latter.

We will now describe a method for recharging the battery 24 according to one embodiment of the invention.

The method for recharging the battery 24 comprises at least the following steps, preferably carried out in the order stated below:

lowering the electrical connection element 27 connected to the power supply cable 28 toward the unwound position using the second motorized drive device 29, and connecting an external electrical supply source 25 on the electrical connection element 27 positioned at the end of the power supply cable 28.

Advantageously, the unwinding of the power supply cable 28 is implemented using the second motorized drive device 29 to a predefined position for recharging the battery 24.

Preferably, the predetermined position for recharging the battery 24 is defined so as to be inaccessible for children, for example at a height of about one meter and fifty centimeters relative to the floor of a room where the home-automation equipment is located, so as to guarantee safety and prevent a child from being able to access the first electrical connection element 27 located at the free end of the power supply cable 28.

In a first embodiment, before the step for lowering the electrical connection element 27, the method for recharging the battery 24 comprises at least the following steps:

determining the charge level of the battery 24, comparing the determined value of the charge level of the battery 24 to a predetermined threshold value, and controlling the electromechanical actuator 30 of the second motorized drive device 29, when the determined value of the charge level of the battery 24 is below the predetermined threshold value.

Thus, the second motorized drive device 29 unwinds the power supply cable 28 when the charge level of the battery 24 is below the predetermined threshold value, such that the electrical connection element 27 is at a height accessible by the user to recharge the battery 24 from the external electric supply source 25.

In this way, the unwinding of the power supply cable 28 is implemented automatically by the second motorized drive device 29, in particular by the electronic control unit 15 controlling the second motorized drive device 29, so as to warn the user that the battery 24 needs to be recharged from the external electric supply source 25.

Furthermore, the unwinding of the power supply cable 28 using the second motorized drive device 29 to the predetermined position for recharging the battery 24 allows the user to be visually notified of the need to recharge the battery 24 from the external electric supply source 25, and, in particular, without having to use a specific lighting device or a particular movement of the second motorized drive device 29.

In a second embodiment, before the step for lowering the electrical connection element 27, the method for recharging the battery 24 comprises at least the following steps:

activating a selection element of a local command unit 12, 14, the local command unit 12, 14 cooperating with the electronic control unit 15 controlling the second motorized drive device 29, and controlling the electromechanical actuator 30 of the second motorized drive device 29.

Thus, the second motorized drive device 29 unwinds the power supply cable 28 when a selection element of the local control unit 12, 14 has been activated, such that the electrical connection element 27 is at a height accessible by the user to recharge the battery 24 from the external electric supply source 25.

As a non-limiting example, the activation of a selection element of the local control unit 12, 14 may correspond to a long press, i.e., for a period of time exceeding a predetermined threshold value, which may for example be around several seconds.

The activation of a selection element of the local command unit 12, 14 allowing the command of the second motorized drive device 29 can be implemented differently and, in particular, through a specific menu of the local command unit 12, 14, a specific button of the local command unit 12, 14, or a specific activation sequence of one or several buttons of the local command unit 12, 14.

Owing to the present invention, the concealing device comprises two independent motorized drive devices respectively comprising an electromechanical actuator, where the first motorized drive device makes it possible to move the screen, between a high position and a low position, and where the second motorized drive device makes it possible to wind and unwind the power supply cable around the winding spool, between a wound position and an unwound position, so as to be able to access the electrical connection element to recharge the battery positioned at the holding device of the screen.

Of course, many changes can be made to the example embodiments previously described without going beyond the scope of the invention defined by the claims.

In particular, the second motorized drive device 29 can be fastened at the end of the power supply cable 28 including the electrical connection element 27, instead of being fastened at the housing 9 of the concealing device 3.

Thus, the second motorized drive device 29 can be movable relative to the holding device 9, 23 of the screen 2 and set in motion based on the winding and unwinding of the power supply cable 28 connecting the electrical connection element 27 to the battery 24.

In one embodiment, the autonomous electrical energy supply device 26 comprises another battery, not shown, so as to supply electrical energy to the second motorized drive device 29, in particular when the charge level of the main battery 24 allowing the supply of electrical energy to the first motorized drive device 5 has reached a predetermined threshold value.

Thus, the supply of electrical energy of the second motorized drive device 29 by an auxiliary battery makes it possible to unwind the power supply cable 28 and to place the first electrical connection element 27 at a height, so as to be able to recharge the main battery 24 from the external electric supply source 25, in particular when the charge level of the main battery 24 is below or equal to the predetermined threshold value.

Furthermore, the second motorized drive device 29 may also comprise an electronic control unit, not shown.

The electronic control unit of the second motorized drive device 29 can be configured to cooperate with the electronic control unit 15 of the electromechanical actuator 11 of the first motorized drive device 5, so as to exchange data with one another.

Furthermore, the considered embodiments and alternatives may be combined to generate new embodiments of the invention, without going beyond the scope of the invention defined by the claims.

The invention claimed is:

1. A closure or solar protection home-automation equipment comprising a concealing device, the concealing device comprising at least:
   a screen,
   a support for holding the screen,
   a first motorized drive device, and
   an autonomous electrical energy supply device,
   the first motorized drive device comprising at least:
   a first electromechanical actuator operative to raise and lower the screen between a high position and a low position, the first electromechanical actuator being electrically connected to the autonomous electrical energy supply device,
   the autonomous electrical energy supply device comprising at least:
   a battery being positioned at the support for holding the screen,
   a power supply cable, and
   a first electrical connection element, the first electrical connection element being electrically connected to the battery by the power supply cable, the first electrical connection element being configured to he connected to an external electric supply source, so as to recharge the battery,
   wherein the concealing device comprises a second motorized drive device, the second motorized drive device comprising at least:
   a second electromechanical actuator operative to wind and unwind the power supply cable, electrically connecting the first electrical connection element to the battery, on a winding spool, between a wound configuration, where the first electrical connection element is in an upper position, and an unwound configuration, where the first electrical connection element is in a lower position, the second electromechanical actuator of the second motorized drive device being operative to both wind and unwind the power supply cable.

2. The closure or solar protection home-automation equipment according to claim 1, wherein the second motorized drive device is positioned on an outside of a housing of the concealing device.

3. The closure or solar protection home-automation equipment according to claim 1, wherein the second motorized drive device is positioned inside a housing of the concealing device.

4. The closure or solar protection home-automation equipment according to claim 1, wherein the second electromechanical actuator of the second motorized drive device comprises at least one electric motor, an output shaft of which is kinematically connected to the winding spool of the power supply cable.

5. The closure or solar protection home-automation equipment according to claim 1, wherein the first motorized drive device comprises an electronic control unit, the electronic control unit controlling the first electromechanical actuator of the first motorized drive device and controlling the second electromechanical actuator of the second motorized drive device.

6. The closure or solar protection home-automation equipment according to claim 1, wherein the second motorized drive device comprises a platen, the platen being mounted on the support for holding the screen with fastening elements.

7. The closure or solar protection home-automation equipment according to claim 6, wherein the winding spool of the power supply cable is mounted to freely rotate on the platen, around a rotation axis defined by a rotation shaft, the rotation shaft of the winding spool also comprising a second electrical connection element.

8. The closure or solar protection home-automation equipment according to claim 1, wherein the autonomous electrical energy supply device comprises another battery, so as to supply electrical energy to the second motorized drive device.

9. The closure or solar protection home-automation equipment according to claim 2, wherein the support for holding the screen belongs to the housing.

10. The closure or solar protection home-automation equipment according to claim 2, wherein the support is a flange of the housing.

11. A method for recharging the battery for the closure or solar protection home-automation equipment according to claim 1, wherein said method comprises at least the following steps:

lowering the first electrical connection element connected to the power supply cable toward the lower position using the second motorized drive device, and connecting the external electrical supply source to the first electrical connection element positioned at an end of the power supply cable.

12. The method for recharging the battery for the closure or solar protection home-automation equipment according to claim 11, wherein, before the step for lowering the first electrical connection element, said method comprises at least the following steps:

determining a charge level of the battery, comparing the determined value of the charge level of the battery to a predetermined threshold value, and controlling the second electromechanical actuator of the second motorized drive device, when the determined value of the charge level of the battery is below the predetermined threshold value.

13. The method for recharging the battery for the closure or solar protection home-automation equipment according to claim 11, wherein, before the step for lowering the first electrical connection element, said method comprises at least the following steps:

activating a selection element of a local command unit, the local command unit cooperating with an electronic control unit controlling the second motorized drive device, and controlling the second electromechanical actuator of the second motorized drive.

* * * * *

UNITED STATES PATENT AND TRADEMARK OFFICE
CERTIFICATE OF CORRECTION

| | | |
|---|---|---|
| PATENT NO. | : 10,227,822 B2 | Page 1 of 1 |
| APPLICATION NO. | : 15/744292 | |
| DATED | : March 12, 2019 | |
| INVENTOR(S) | : Eric Lagarde and Norbert Dupielet | |

It is certified that error appears in the above-identified patent and that said Letters Patent is hereby corrected as shown below:

On the Title Page

Left column:
"(73) Assignee: SOMFY ACTIVITIES SA, Cluses (FR)"

Should be replaced with:
-- (73) Assignee: SOMFY ACTIVITES SA, Cluses (FR) --.

Signed and Sealed this
Thirteenth Day of August, 2019

Andrei Iancu
*Director of the United States Patent and Trademark Office*